US005091894A

United States Patent [19]

Warnan

[11] Patent Number: 5,091,894

[45] Date of Patent: Feb. 25, 1992

[54] SUSPENSION DEVICE FOR ACOUSTIC BASE

[75] Inventor: François Warnan, Rambouillet, France

[73] Assignee: Thomson-CSF, Puteaux, France

[21] Appl. No.: 668,173

[22] Filed: Mar. 12, 1991

[30] Foreign Application Priority Data

Mar. 23, 1990 [FR] France ............................ 90 03747

[51] Int. Cl.[5] ............................ G01V 1/38

[52] U.S. Cl. ............................ 367/173; 248/202.1

[58] Field of Search ............ 181/0.55, 108–110, 181/122, 140, 141; 367/141, 173, 188, 191; 248/201, 202.1

[56] References Cited

U.S. PATENT DOCUMENTS

| | | | |
|---|---|---|---|
| 1,348,538 | 8/1920 | Blake | 367/173 |
| 1,401,024 | 12/1921 | Wood et al. | 181/142 |
| 2,582,994 | 1/1952 | Kondall | 367/173 |
| 2,832,944 | 4/1958 | Kessler | 367/173 |
| 4,144,518 | 3/1979 | Minohara et al. | 367/173 |
| 4,462,094 | 7/1984 | Bowden et al. | 367/188 |

FOREIGN PATENT DOCUMENTS

| | | | |
|---|---|---|---|
| 447188 | 3/1948 | Canada | 367/173 |

*Primary Examiner*—Brian S. Steinberger
*Attorney, Agent, or Firm*—Oblon, Spivak, McClelland, Maier & Neustadt

[57] ABSTRACT

In a device for the suspension of a sonar acoustic base within its protection dome, two connection rods are used. These two connection rods are hinged, by one side, on the hull of the ship and, on the other side, on the acoustic base. These connection rods form a triangular system which, during the motions of the base, dictates a rotation of this base about an instantaneous center of rotation R located above the center of gravity G of the base. In this way, when the base touches the internal surface of the dome, the impact occurs as a surface-to-surface impact and not as a corner-to-surface impact. This limits the damage caused by the impacts, thus making it possible to obtain, simultaneously, a very free suspension of the acoustic base and efficient protection of the sonar dome.

1 Claim, 1 Drawing Sheet

SUSPENSION DEVICE FOR ACOUSTIC BASE

BACKGROUND OF THE INVENTION

1. Field of the Invention

The present invention relates to devices that enable the suspension of acoustic bases so as to make it possible to combat the effects of swells of the sea.

2. Description of the Prior Art

Acoustic bases, namely sets of acoustic transducers that enable the reception or transmission of acoustic signals in water, notably for sonars, are often fixed beneath the hull of a ship within a protective shell called a sonar dome, itself generally filled with an acoustically adapted protective liquid. Since the ships generally shift under the effect of the waves, the acoustic beam, both in transmission and in reception, follows the motions of the base, and it soon becomes necessary to compensate for these shifts. Although electronic compensation is possible, the generally preferred method, at least to compensate for the biggest motions, is to suspend the base in such a way that it tends to remain vertical despite these motions of the ship. To make the explanation easier to understand, and to simplify the terms, it may be said, in considering the relative motion and assuming that the ship is still, that the base swings angularly about its point of suspension from the hull. Although it is possible to think of making the dome too oscillate, the usual practice, for mechanical as well as for hydrodynamic reasons, is to fix the dome rigidly to the hull of the ship and to suspend the base inside this dome in which it oscillates with relative freedom. Furthermore, since the effects of the waves are far more pronounced in rolling than in pitching motions, the base is generally suspended so that it can oscillate laterally with respect to the axis of the ship: this compensates for the rolling motions. At the same time the base remains rigidly fixed with respect to the longitudinal axis: this makes it follow the pitching motions which are smaller than the rolling motions.

If a small base could be placed in a big dome, this base would have all the space needed to move within the dome without striking the dome walls. This approach is not generally adopted because the dome slows down the ship and therefore has to be made as small as possible in taking account of the dimensions of the base that it has to contain. Under these conditions, the base tends to strike the internal walls of the dome as soon as the rolling reaches a certain magnitude. These impacts are all the more dangerous as the base which, for example, has the shape of a circular drum with a vertical axis, has relatively sharp corners and considerable weight. Despite the shock absorption provided by the liquid filling the dome, there remains a risk, therefore, that the impacts will batter down the dome. To prevent collision of this kind, it then becomes necessary to use various corrective devices such as stops that restrict the pendular deflection of the base. These corrective devices are far from satisfactory since, precisely in limiting the motions of the base, they tend to fix it rigidly to the hull and therefore counter the compensation that is to be obtained by suspending it pendularly.

SUMMARY OF THE INVENTION

To overcome these drawbacks, the invention proposes a device for the suspension, beneath the hull of a boat, of an acoustic base enclosed in a protective dome comprising two connecting rod fixed by hinges, on one side beneath the hull of the ship and, on the other side, to the acoustic base, these connecting rods being inclined so that the straight lines joining the hinge points of each connecting rod intersect at a point R located above the center of gravity G of the acoustic base.

BRIEF DESCRIPTION OF THE DRAWING

Other particular features and advantages of the invention will appear from the following description, given as a non-restrictive example with reference to the appended drawing, wherein.

DETAILED DESCRIPTION OF THE INVENTION

Figure 1:
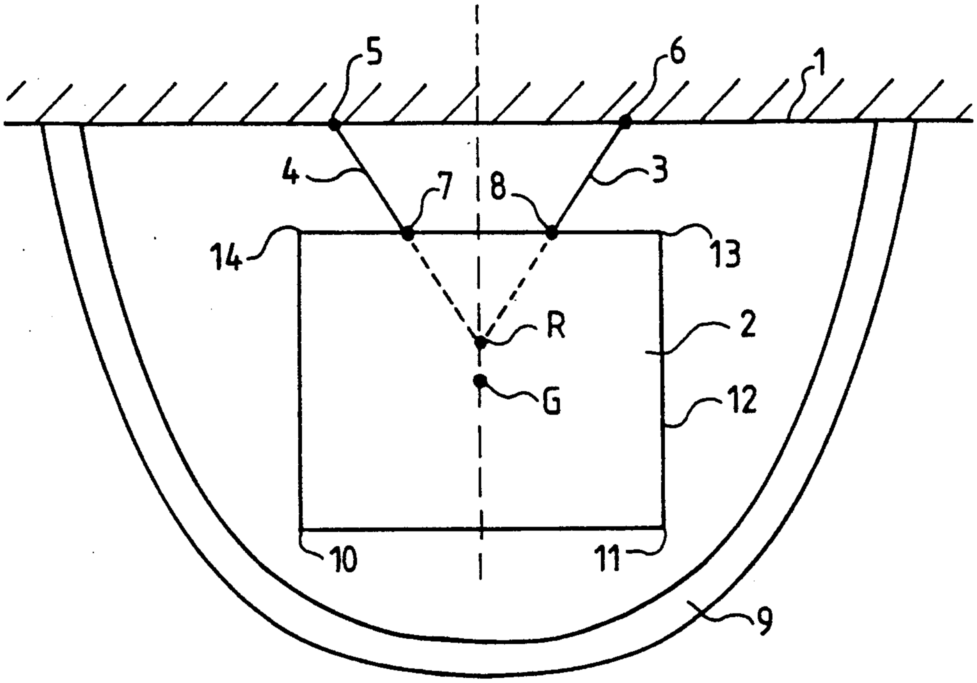
FIG. 1 shows a sectional view, perpendicular to the roll axis, of a sonar dome enclosing an acoustic base suspended according to the invention.

FIG. 1 shows a cross-section with respect to the axis of the ship carrying a sonar dome 9 protecting an acoustic base 2 suspended from the lower part of the hull of a carrier ship by means of two connecting rods 3 and 4 hinged, by one side, on the upper face of the base by means of ball joints 7 and 8 and, by the other side, on the ship's hull by means of ball joints 5 and 6.

This device has to be compared to the one that would have been obtained if the base 2 were to be suspended from the hull 1 by a simple system formed, for example, by a connection rod fixed along the central axis of the base and hinged, for example, beneath the hull. Under these conditions, it is quite clear that the base, in swinging at the end of this hinge point, will strike the dome 9 by its pointed lower ends 10 and 11, thus creating the risk that the this dome may be punctured.

With the system according to the invention, it is equally clear that, when the base swings laterally, it follows not only a motion of lateral translation but also a rotational motion about an imaginary center of rotation located at the intersection of the prolongation of the axes of the connection rods. This instantaneous center of rotation is, of course, not fixed in relation to the axis but, for the small angles, it remains substantially at the same place.

In this way, therefore, when the base shifts, for example, from left to right in coming close to the right-hand part of the dome, it undergoes a clockwise, rotational motion that tends to make the lateral face 12 of the base substantially parallel to the internal surface of the sonar before this face. Correlatively, the lower corner 11 of this base approaches the dome to a far lesser extent than in the case of the standard angular suspension, while the upper right-hand corner 13 comes far closer to this dome: this is of little importance since the safety space between this corner and the dome is far greater than for the corner 11. Thus, if we assume that the pitching motion is violent enough to make the base strike the dome, this impact will occur between the face 12 and the internal face of the dome, and will be a substantially surface-to-surface impact, and the impact of the corners 11 and 13 will be far less harmful in this direction than the direct impact of the corner 11 in the known approach.

Clearly, the effect is the same but occurs on the other side when the base swings from right to left, and then it is the lower left-hand corner 10 and the upper left-hand corner 14 that are involved.

Furthermore, since the length of the pendulum equivalent to the system is reduced, the inherent oscillation frequency of the base/connection-rods assembly increases. This is a favorable factor, since the frequency of the waves is relatively small. The assembly is thus less likely to go into resonance.

Furthermore, in these types of motion, the protective fluid that fills the interior of the dome is subjected to a smaller degree of swirling forces: this facilitates the motions of the base instead of hampering them, and prevents this fluid from exerting force on the hydrophones, such force being a source of undesirable parasite noises.

The dimensions of the connection rods and the arrangement of the fastening points is not of critical importance, except that the instantaneous center of rotation R should always be located above the center of gravity G of the base. Indeed, otherwise, the base would tend to swing backwards, which would give a result opposite to that expected. Given the different parameters that act notably on the internal shape of the sonar as well as on the shape and the dimensions of the base, the analytic resolution of the problem is a relatively arduous task. By contrast, an approximate solution to achieve the desired motion, corresponding to a surface-to-surface contact during a possible impact, can easily be obtained by those skilled in the art through some prior graphical trials.

It will be noted that, if the angle of inclination between the connection rods is increased, either by bringing their lower ends closer together or by moving their upper ends further apart, the case of the simple pendulum is approached. Conversely, when this angle is reduced, either by moving the lower ends of the connection rods further apart or by bringing their upper ends closer together, the system tends to be made indifferent to (i.e. to be unaffected by) the motion of the ship. This quality of being unaffected by the motion of the ship is total, at least for the small angles when the intersection occurs at the center of gravity G.

It will also be noted that, if the distance between the upper hinges of the connection rods is smaller than the distance between the lower connection rods, the instantaneous center of rotation being then located above the surface of the hull 1, we still obtain the desired effect. However, in this case, while the motion is accurate for the small angles, notably by keeping a relatively constant angle of sight, the lateral shift of the base is high and often even excessive.

Besides, it has been observed that the length of the connection rods has little effect on the motion of the assembly.

Figure 2:
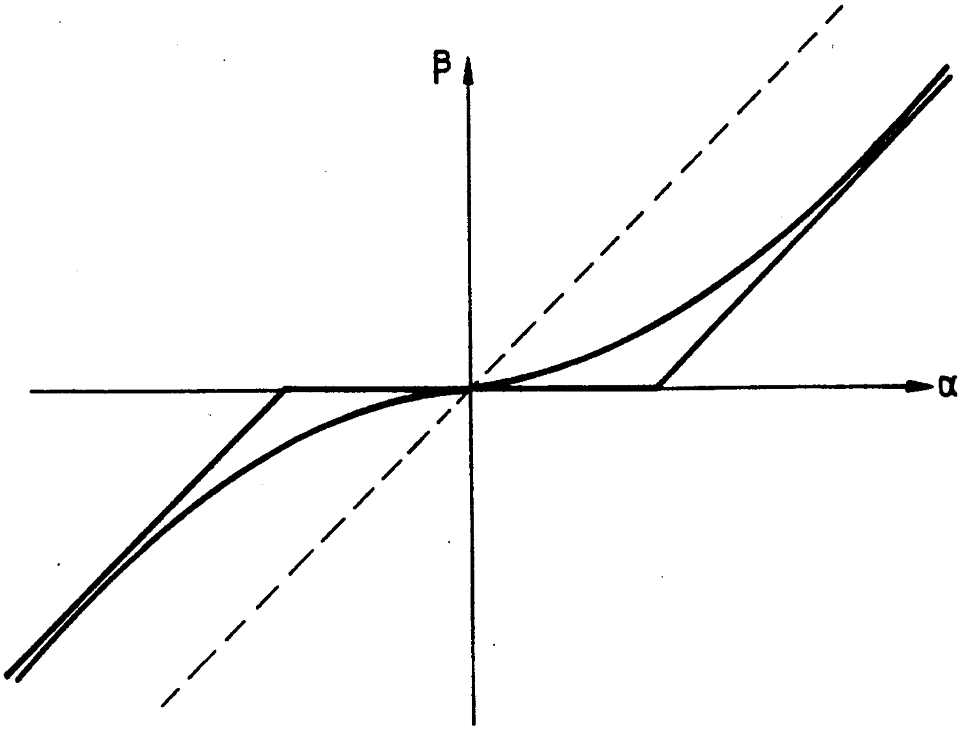
FIG. 2 is a graph of the angles of deflection of the ship and of the base.

FIG. 2 shows the angle of roll $\beta$ of the sonar base as a function of the angle of roll $\alpha$ of the ship. A dashed line represents the bisector that would correspond to a fixed link between the base and the ship. Solid lines indicate the angle corresponding to the position of FIG. 1. It is seen that this angle is substantially smaller for the small inclination values: this clearly corresponds to the desired effect of the suspension of the base. This angle increases gradually to approach the form an asymptote corresponding to the stop against the walls of the hull.

What is claimed is:

1. A device for suspending an acoustic base enclosed in a protective dome beneath a ship hull, comprising:

first and second connecting rods, each of said first and second connecting rods being rotatably connected on one side to different positions beneath said hull through first and second hinge means and being rotatably connected on the other side to different positions on said acoustic base through third and fourth hinge means, each of said first and second connecting rods being inclined from said hull to said acoustic base such that longitudinal axes of each of said connecting rods extend and intersect at a point R located above a center of gravity of the acoustic base;

wherein said first and second connecting rods connected to said hull and said acoustic base form a triangular system which permits a lateral and rotational movement of said acoustic base about said point R such that during the movement of said acoustic base, a facing surface of said acoustic base closest to said protective dome is substantially parallel to a surface of said dome facing the facing surface of said acoustic base.

* * * * *